(12) United States Patent
Tate

(10) Patent No.: US 6,509,833 B2
(45) Date of Patent: Jan. 21, 2003

(54) METHOD AND SYSTEM FOR PROVIDING A WARNING ALERT

(75) Inventor: Peter Tate, Greensboro, NC (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/861,998

(22) Filed: May 18, 2001

(65) Prior Publication Data

US 2002/0171552 A1 Nov. 21, 2002

(51) Int. Cl.$^7$ ................................................. H04Q 7/00
(52) U.S. Cl. ....................... 340/539; 340/531; 340/502; 340/601; 379/355; 379/265; 379/266; 379/267
(58) Field of Search ....................... 340/539, 7.2, 7.21, 340/7.46, 7.48, 531, 502, 601; 379/69, 51, 88.23, 355, 67, 76, 77, 85, 88, 89, 201, 265, 266, 267

(56) References Cited

U.S. PATENT DOCUMENTS

| | | | |
|---|---|---|---|
| 5,278,539 A | * 1/1994 | Lauterbach et al. | 340/539 |
| 5,444,433 A | * 8/1995 | Gropper | 340/601 |
| 5,559,867 A | 9/1996 | Langsenkamp et al. | 379/69 |
| 5,912,947 A | 6/1999 | Langsenkamp et al. | 379/69 |
| 6,002,748 A | * 12/1999 | Leichner | 340/601 |
| 6,009,149 A | 12/1999 | Langsenkamp | 379/69 |
| 6,028,514 A | 2/2000 | Lemelson et al. | 340/539 |
| 6,112,075 A | 8/2000 | Weiser | 455/404 |
| 6,169,476 B1 | 1/2001 | Flanagan | 340/286.02 |
| 6,263,063 B1 | * 7/2001 | Bansal et al. | 379/164 |

OTHER PUBLICATIONS

Article entitled: A New Flood Rescue Response Model. Advanced Rescue Technology, Feb./Mar. 2001, pp. 32–38.

Web page printout from Reverse 911, url: www.r911.com et seq.

* cited by examiner

Primary Examiner—Daniel J. Wu
Assistant Examiner—Daniel Previl
(74) Attorney, Agent, or Firm—Brian K. Johnson, Esq.

(57) ABSTRACT

A method and a system for providing a warning alert to subscribers of a telecommunication system is disclosed. In one aspect, the warning system includes a central switch and a remote switch, each switch coupled to a different plurality of subscribers to be contacted by the emergency notification provider that issues the emergency warning alert. In another aspect, the warning system contains a ringing tones database having different ringing tones corresponding to different emergency conditions, where an appropriate ringing tone is select by the telecommunication system and routed to the subscribers depending on the type emergency for which the emergency notification provider is providing the warning. In another aspect, a method of distributing a warning alert is disclosed in which a warning alert is selected from a number of warning alerts corresponding to a number of different emergency conditions, the telecommunication system receives the warning alert, selects a set of subscribers to which the warning alert is to be distributed, selects a ringing tone appropriate to the warning alert type and routes the ringing tone to the selected subscribers. In another aspect, the above method is disclosed that further includes a method for billing an appropriate government agency or local municipality for the emergency notification service.

6 Claims, 3 Drawing Sheets

METHOD AND SYSTEM FOR PROVIDING A WARNING ALERT

FIELD OF THE INVENTION

The present invention relates to a method and apparatus for distributing an emergency warning utilizing an existing wirelined, wireless or computer-based telecommunication system.

BACKGROUND OF THE INVENTION

In the event of an imminent emergency situation, such as severe weather, flooding, fire, etc. a government authority normally sends a general public warning message via television or radio in an attempt to inform the public about this situation. Unfortunately, those members of the public which do not currently have the TV or radio turned on, are not informed about the imminent emergency. Another known technique used to inform people about emergency situations are general public warning systems, such as sirens and the like. However, all geographic areas are covered with such warning systems and the installation and maintenance of new or additional warning systems is expensive.

Furthermore in the event of a power outage, for example, the involved public normally doesn't get any information regarding the reasons for the power outage. The public also does not receive any information regarding the restoration of power, thereby creating an unsatisfactory situation. Thus, power outages are also emergency situations in which a need exists for establishing an effective means of communicating during the emergency.

One advantage of distributing a warning alert over an existing telecommunication system is that houses are not equipped with or are not connected to a siren or other kinds of known public warning systems. However, nearly every house is connected to a telecommunication and/or computer system.

SUMMARY OF THE INVENTION

In a preferred embodiment, the present invention provides a telecommunication-based warning distribution system having a central switch including a controller and a subscriber database, the subscriber database including information regarding a plurality of subscribers and subscriber characteristic data associated with each subscriber, the central switch coupled to a first plurality of communications devices associated with the plurality of subscribers; a remote switch coupled to the central switch, the remote switch coupled to a second plurality of communications devices associated with the second plurality of subscribers; and an emergency notification provider coupled to either of the central switch and the remote switch, the emergency notification provider generating a warning alert for subscribers having a particular subscriber characteristic and transmitting the warning alert to the central switch, the controller selecting a set of subscribers from the subscriber database that match the particular subscriber characteristic and routing the warning alert to the communication devices of the set of selected subscribers.

In a particular embodiment of the present invention, the subscriber characteristic is a geographic location of the communication devices for the selected subscribers determined by a phone number of the communication devices of the selected subscribers. In another aspect of the invention, the subscriber characteristic is an actual, GPS-determined geographic location of the communication devices. In yet another aspect, the subscriber characteristic is a power supply providing power to the selected subscribers or a communication service provider.

In another particular embodiment of the invention, the telecommunications-based warning system further has a base station coupled to a third plurality of mobile communication devices associated with the plurality of subscribers, the controller selecting at least one subscriber from the third plurality of subscribers as matching the particular subscriber characteristic and routing the warning alert to the third plurality of mobile communication devices of the selected subscribers.

In another particular embodiment of the invention, the communication device is a land-line telephone coupled to either of the central switch and the remote switch, or the communication device is a cellular telephone, a wireless personal data assistant or a personal computer.

In another aspect of the invention, the telecommunications-based warning further has a call signal generator, the call signal generator issuing ringing commands to the communication devices of the selected subscribers under control of the controller to distribute the warning alert.

In yet another aspect, the emergency notification provider is capable of providing a plurality of warning alerts corresponding to a plurality of emergency conditions, the emergency notification provider transmitting warning alert type data to the central switch with the warning alert, the controller selecting a set of subscribers from the subscriber database that match the particular subscriber characteristic based on the warning type data. In this aspect, the central switch further has a call signal generator and a ringing tone database having a plurality of ringing tones, each ringing tone associated with a different emergency condition, the call signal generator selecting a ringing tone according to the warning alert type data and issuing ringing commands corresponding to the selected ringing tone to the communication devices of the selected subscribers under control of the controller to distribute the warning alert. In this aspect, the first and second plurality of communication devices includes different communication device types and the central switch further includes a communication device database having data regarding ringing characteristics for each of the device types, the selected ringing tone for each communication device being further selected according to the ringing characteristic data. In another aspect of the invention including a plurality of emergency conditions, the central switch further has an announcement database having a plurality of emergency announcements, each announcement associated with a different emergency condition, the controller selecting an announcement according to the warning alert type data the controller routing the selected announcement to the communication devices of the selected subscribers as the warning alert. In still another aspect of the invention, the announcement is a synthesized voice announcement, a real-time voice announcement, or an alphanumeric text message.

In another aspect of the invention, the remote switch further includes a remote subscriber database having information regarding the plurality of subscribers associated with the second plurality of communications devices and a remote controller for receiving the warning alert form the central switch and selecting the set of subscribers from the remote subscriber database that match the particular subscriber characteristic, the remote controller routing the warning alert to the second plurality of communication devices of the subscribers selected by the remote controller. In still another aspect of the invention, the communication devices of the selected subscribers transmit a receipt message to the controller upon receiving the warning alert or transmits the receipt message from the communication device to the emergency warning provider. In another aspect of the invention, the warning alert is routed to the communication devices of the selected subscriber by interrupting an in-progress call with the selected subscriber, for example, where the in-progress call is interrupted by a tone, or a synthesized voice announcement.

In anther aspect of the invention, the central switch and the remote switch are part of a computer network coupled to the central and remote switches, the computer network being part of a voice communication system over a data network ('VoIP'), or the central switch and the remote switch are part of a wireless network coupled to the central and remote switches.

In another particularly preferred embodiment, a telecommunication-based warning distribution system is provided having a switch including a controller coupled to a subscriber database and a tone database, the subscriber database including information regarding a plurality of subscribers and subscriber characteristic data associated with each subscriber, the switch coupled to a plurality of communication devices associated with the plurality of subscribers, the tone database containing a plurality of ringing tones for use with the plurality of communication devices; and an emergency notification provider coupled to the switch, the emergency notification provider selecting a warning alert from a plurality of warning alerts corresponding to a plurality of emergency conditions, the emergency notification provider transmitting a particular subscriber characteristic and warning alert type data with the warning alert to the switch, the controller selecting a set of subscribers from the subscriber database that match the particular subscriber characteristic and a ringing tone from the tone database corresponding to the warning alert type data, the controller routing the selected tone to the communication devices of the set of selected subscribers. In this aspect, the plurality of communication devices may include different communication device types and the central switch further includes a communication device database having data regarding ringing characteristics for each of the device types, the selected ringing tone for each communication device being further selected according to the ringing characteristic data.

In yet another aspect, the central switch further has a call signal generator and an announcement database having a plurality of emergency announcements, each announcement associated with a different emergency condition, the controller selecting an announcement according to the warning alert type, the controller routing the selected announcement to the communication devices of the selected subscribers of the warning alert. In this aspect, the announcement is a synthesized voice announcement, a realtime voice announcement, or an alphanumeric text message.

In still another aspect of the invention, the warning alert is routed to the communication devices of at least one of the selected subscribers by interrupting an in-progress call with the selected subscriber.

In a particularly preferred method of the present invention, a warning is distributed using a telecommunication-based system and includes the steps of selecting a warning alert from a plurality of warning alerts corresponding to a plurality of emergency conditions, the warning alert including warning type data and subscriber characteristic data; and receiving at a switch the selected warning alert, the switch including a controller, a subscriber database including information regarding a plurality of subscribers and subscriber characteristic data associated with each subscriber, and a tone database containing a plurality of ringing tones for use with a plurality of communication devices associated with the subscribers; and selecting with the controller a set of subscribers from the subscriber database according to the subscriber characteristic data; and selecting a ringing tone from the tone database corresponding to the warning alert type data; and routing the selected ringing tone warning alert to the selected subscribers.

In a particular aspect, the method of distributing a warning includes the step of determining with the if the emergency notification provider possess permission to issue the warning alert to the subscribers, and wherein the routing step of the selected ringing tone warning alert is performed only for the selected subscribers for which the emergency notification provider has permission. In another aspect, the method of distributing a warning includes the step of verifying a password provided by an emergency notification provider sending the warning alert to the switch and wherein the routing step of the selected ringing tone warning alert is performed only to the selected subscribers for which the password has been verified, or receiving at the switch a confirmation message from the selected subscribers that receive the selected ringing tone warning alert, or wherein the routing step further includes interrupting an in-progress call with the selected subscriber to present the selected ringing tone warning alert.

In a final embodiment of the method of providing a warning alert over a telecommunication-based system in response to a warning alert request from an emergency notification provider includes the steps of receiving at a switch the warning alert request from the emergency notification provider, the warning alert request including subscriber characteristic data for routing the warning alert, the switch having a controller, a subscriber database including information regarding a plurality of subscribers and subscriber characteristic data associated with each subscriber, a billing database for recording charges related to the operation of the switch; and selecting with the controller a set of subscribers from the subscriber database according to the subscriber characteristic data; and routing the warning alert to the selected subscribers; and recording in the billing database a charge for each routed warning alert; and transmitting to an emergency service financier the charges recorded in the billing database.

In a particular aspect of the invention, the step of routing further includes the step of receiving at the switch a confirmation message from the selected subscribers that receive the warning alert; the step of recording further includes the step of recording the confirmation messages associated with each routed warning alert in the billing database; and the step of transmitting further includes the step of selecting the charges having the associated confirmation messages and transmitting the selected charges.

In another aspect of the invention, the method has the emergency service financier as a municipality, a government agency, or the emergency notification provider.

BRIEF DESCRIPTION OF THE DRAWINGS

An exemplary embodiment of the present invention is described in detail below with reference to the drawings.

DESCRIPTION OF THE PREFERRED EMBODIMENTS

Figure 1:
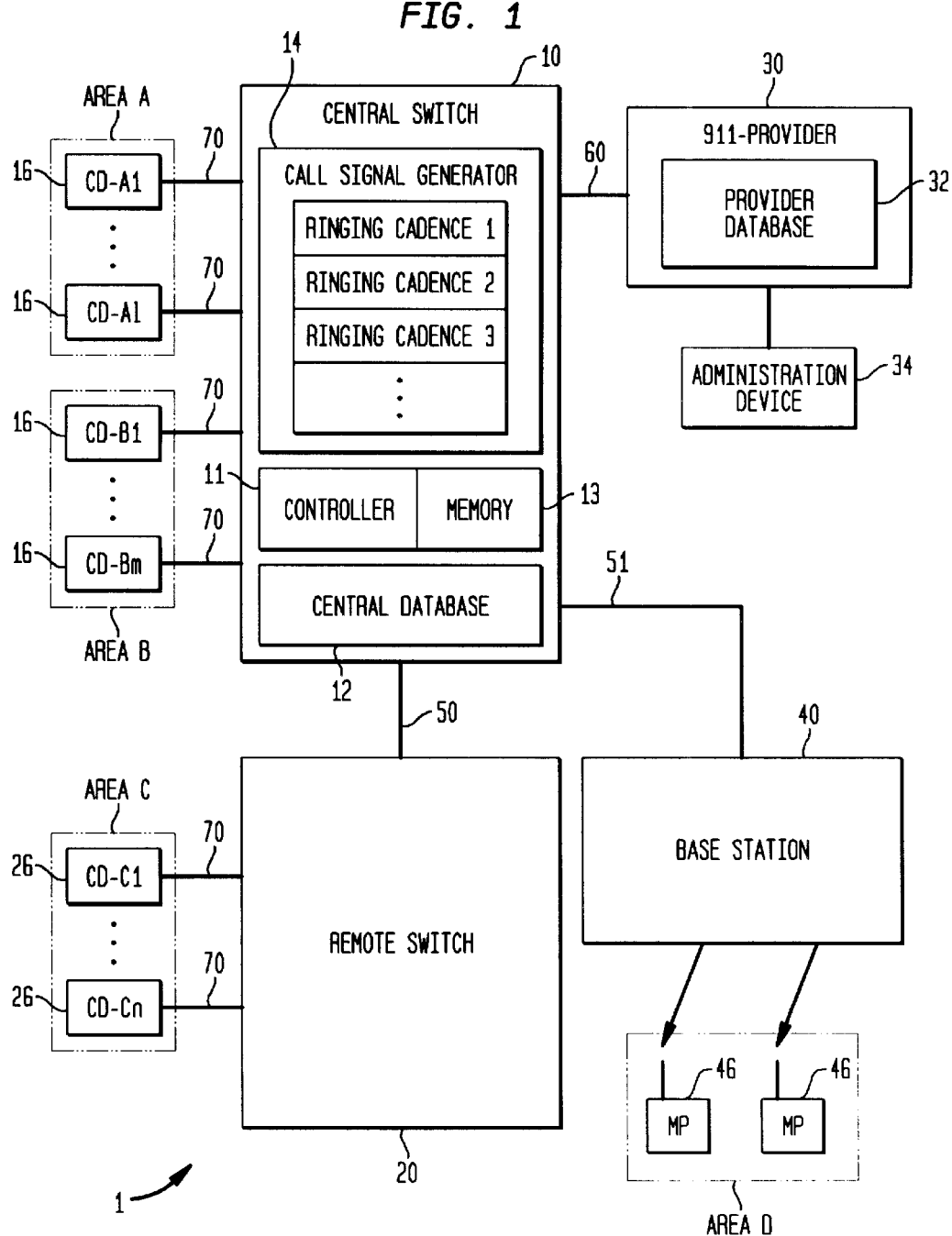
FIG. 1 is a block diagram illustrating a central switch connected with a remote switch, a base station and a 911-provider.

FIG. 1 is a schematic block diagram illustrating a telecommunication system 1 including a central switch 10 connected with a remote switch 20, a base station 40 and an emergency notification provider, or 911-provider, 30 for distributing communications to subscribers of the telecommunication system 1. The central switch 10 may be for example, the Siemens communication switch commonly referred to the industry as the EWSD or the AT&T 5ESS switch. The remote switch 20 may be an external unit of the central switch 10 or a stand-alone private branch exchange (PBX), for example, the Siemens PBX HICOM or the Lucent Merlin system. The base station 40 may be, for example, the Siemens BS 240/241. The remote switch 20 and the base station 40 are connected to the central switch 10 through first links 50 and 51. The 911 provider 30 is connected to the central switch 10 through a second link 60. Alternatively the remote switch 20, the 911-provider 30 or the base station 40 can be coupled to the central switch 10 over a switched telephone network (e.g. an ISDN-network) or a computer network, e.g. a local area network (LAN) or the Internet.

First communication devices 16 are connected to the central switch 10 and second communication devices 26 are connected to the remote switch 20. First and second communication devices 16 and 26 are connected to the central switch 10 and the remote switch 20 through third links 70. Examples of first and second communication devices 16, 26 are telephones or personal computers capable of running telephony connectivity application software. In addition to first and second communication devices 16 and 26, mobile communication devices 46 located in a cell or a cluster of cells covered by the base station 40, may also have transmissions going through telecommunication system 1 and thereby are capable of receiving communications from telecommunication system 1.

In the embodiment shown in FIG. 1, first communication devices 16, are connected to the central switch 10 and are located in a first geographical area A. First communication devices, CD-B1, . . . , CD-Bm, are also connected to the central switch 10 and are located in a second geographical area B. Second communication devices, CD-C1, . . . , CD-Cn, are connected to the remote switch 20 and are located in a third geographical area C. For example, the geographic areas A, B and C may be defined by the unique area codes, telephone exchanges or other data identifying a geographic location for the communication device. Alternatively, the geographical areas A, B, and C may be defined by the particular power supply system to which the subscriber is connected. Mobile communication devices 46 located within the cell covered by the base station 40 may be associated with a fourth geographical area D which may be irrespective of the actual physical position of the mobile communication devices. In this system arrangement, for example, all mobile communication devices 46 would receive the warning alert from the 911 provider since the base station itself services the geographical area of interest, despite the fact that any one mobile communication device may have a phone number not generally associated with that geographical area. As an added feature, the mobile communication devices which are "homed" at base station 40, i.e. those devices that spend a great deal of time being serviced by that base station, may also be provided the warning alert pertaining to that geographical area. Presumably, this feature would be provided as a service to the travelling mobile user that has a home in the area of the base station, although the user may not be physically present within that area at the time of the emergency notification distribution.

The central switch 10 includes a call signal generator 14 that causes ringing at the first communication devices 16 connected to the central switch 10 through third links 70. The call signal generator 14 is capable of providing several specific ringing cadences, each specific type of warning and/or state of emergency being uniquely identified by a different ring type. The call signal generator 14 is also capable of providing ringing commands to second communication devices 26 through link 50, remote switch 20 and third links 70. Alternatively, the remote switch 20 itself may contain a separate remote call signal generator (not shown) to directly provide ringing to second communication devices 26 through third links 70. The central switch 12 further includes a central database 12, e.g. a disc drive, for storing switch-specific data and data related to the warning alert.

Central switch 10 further includes a controller 11 coupled to the central database 12 that is responsible for coordinating the distribution of the warning alerts to subscribes of telecommunication system 1. Controller 11 operates according to stored program control within coupled memory 13 and according to the data stored in the central database 12. When 911-provider 30 releases a warning alert, for example, controller 11 first operates as selector in which it selects a number of subscribers to notify from the central database 12. Controller 11 then operates as a warning alert generator that selects an appropriate warning alert according to the data stored in central database 12, and sends the selected warning alert to the selected subscriber's communication device 16, 26 or 46.

In a preferred embodiment of the present invention, the information related to the warning alerts is provided by central switch 10 to remote switch 20 and base station 40 through the first links 50 and 51. Alternatively, remote switch 20 and base station 40 each include a remote database for storing information about local subscribers and warning alerts. For example, remote switch 20 may contain the database of selected subscribers within the group of second communications devices 26 and the appropriate warning alerts (e.g. cadences) for geographic area C. Similarly, base station 40 may contain an analogous database for its selected subscribers and area of geographic coverage.

In the embodiment of FIG. 1, the individual subscriber data may also be stored in a provider database 32 of 911-provider 30. An administration device 34, e.g. a personal computer, is coupled with 911-provider 30 to administrate the individual subscriber data stored in provider database 32 and to perform updates to the individual subscriber data in central database 12 and any remote databases in remote switch 20 and base station 40. With this arrangement, the warning alert can be activated very quickly and effectively for the relevant subscribers in the event of an emergency.

Figure 2:
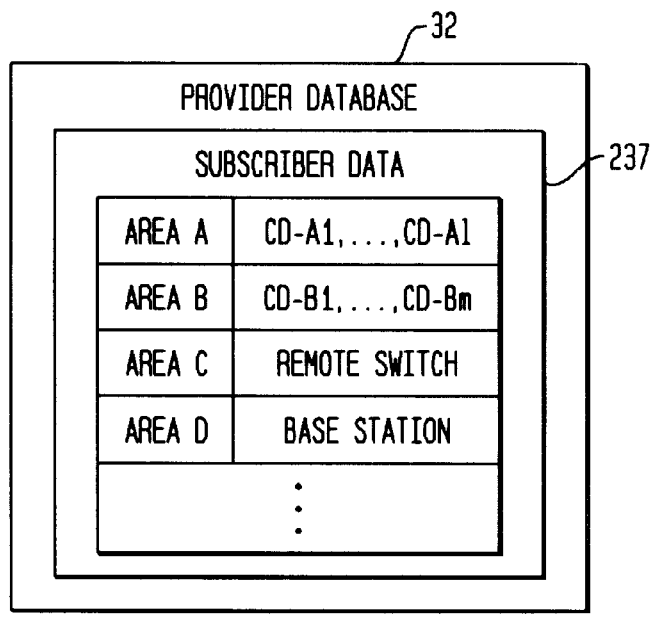
FIG. 2 is a schematic block diagram illustrating a 911-provider database.

FIG. 2 is a schematic block diagram showing the individual subscriber data 237 stored in provider database 32 of 911-provider 30. The individual subscriber data 237 contains information about a geographical area related to the location of one or more communication devices belonging to the subscribers. The geographical area may be defined by an area code of the subscribers' telephone number, for example, in a wirelined telecommunication system, or by a given subscriber's power supply system for the subscriber, or by a cell or a cluster of cells within a wireless telecommunication/paging system.

In the embodiment shown in FIGS. 1 and 2, the communication system 1 is subdivided into four, different geographical areas A, B, C, and D. The subscribers' first communication devices CD-A1, . . . , CD-Al connected to the central switch 10 are assigned to the first geographical area A. The subscribers' first communication devices CD-B1, . . . , CD-Bm connected to the central switch 10 are assigned to the second geographical area B. The subscribers' second communication devices CD-C1, . . . , CD-Cn connected to the remote switch 20 are assigned to the third geographical area C. Finally, the subscribers' mobile communications devices MP 46 located within the cell or a cluster of cells covered by the base station 40 are assigned to the forth geographical area D.

Figure 3:
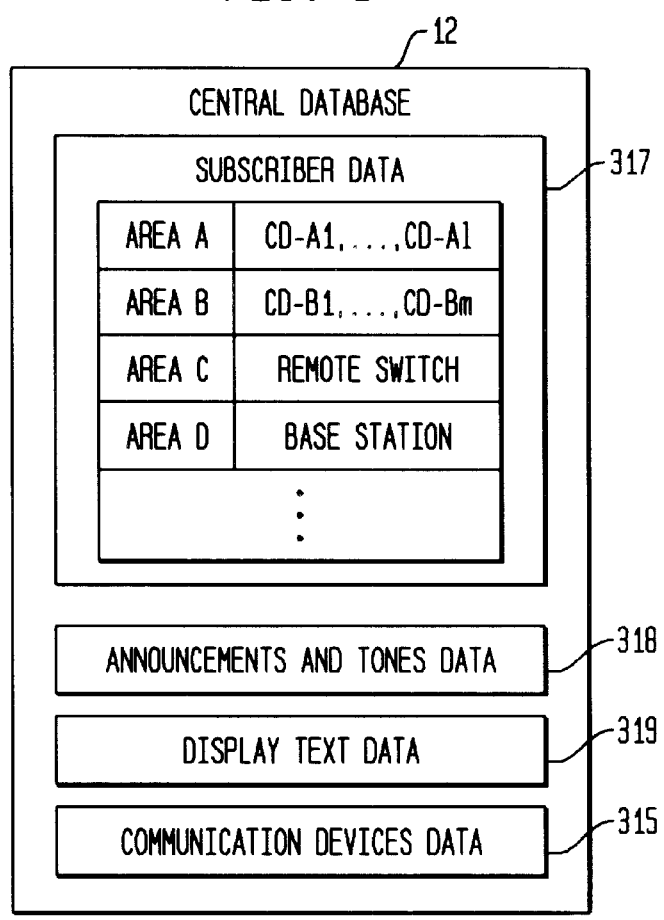
FIG. 3 is a schematic block diagram illustrating an exemplary central switch database.

FIG. 3 is a schematic block diagram illustrating details of the central database 12 and central switch 10. Central database 12 also contains individual subscriber data 317 which is identical to the individual subscriber data 237 stored in provider database 32 of 911-provider 30. The individual subscriber data 317 is updated periodically or in real-time by 911-provider 30 through second link 60.

Central database 12 further contains a plurality of natural or synthesized announcements and tones 318, where each announcement contains different information regarding a particular type of warning and/or state of emergency. For example, the announcement and tone data may contain a table of different tones or announcements where each tone uniquely identifies a particular emergency condition. Further, each emergency condition may have an alert status, e.g., concerning active/passive or low/medium/high probability. Alternatively, one general announcement and status 18 may be provided that would indicate an imminent emergency situation and that advises the subscribers to consult their TV or radio for further information or to seek shelter or to evacuate, etc. There may also be provided an announcement 18 that informs the selected subscribers about a power outage and provides information regarding its restoration.

Central database 12 further contains different alphanumeric display texts 319 typically associated with the announcement and tone data 318. Alphanumeric display texts 319 are provided to subscribers equipped with an enhanced caller ID as part of the warning alert process. Alphanumeric display texts 319 displayed on an alphanumerical display of a selected subscriber's communication device, 16, 26, or a mobile communication device 46. Each alphanumerical display text 319 contains information unique to a particular type of warning and/or state of emergency. Alternatively, one general alphanumerical display text 319 may be provided to indicate an imminent emergency situation and advise the subscribers to consult their TV or radio for further information or to seek shelter or evacuate. Alphanumeric text 319 may also provide information to the selected subscribers about a power outage and a subsequent restoration of power.

The central database 12 further contains specific information 315 regarding the subscriber's communication device, e.g. a particular communication device type, a cell phone model, including optional notification elements, or an enhanced caller ID display. Controller 11 uses this information 315 to select an appropriate kind of warning alert, e.g. an announcement or particular tone/ring type from database 318 or a particular alphanumerical text message from database 319, and sends the selected information to the subscriber's communication device.

Figure 4:
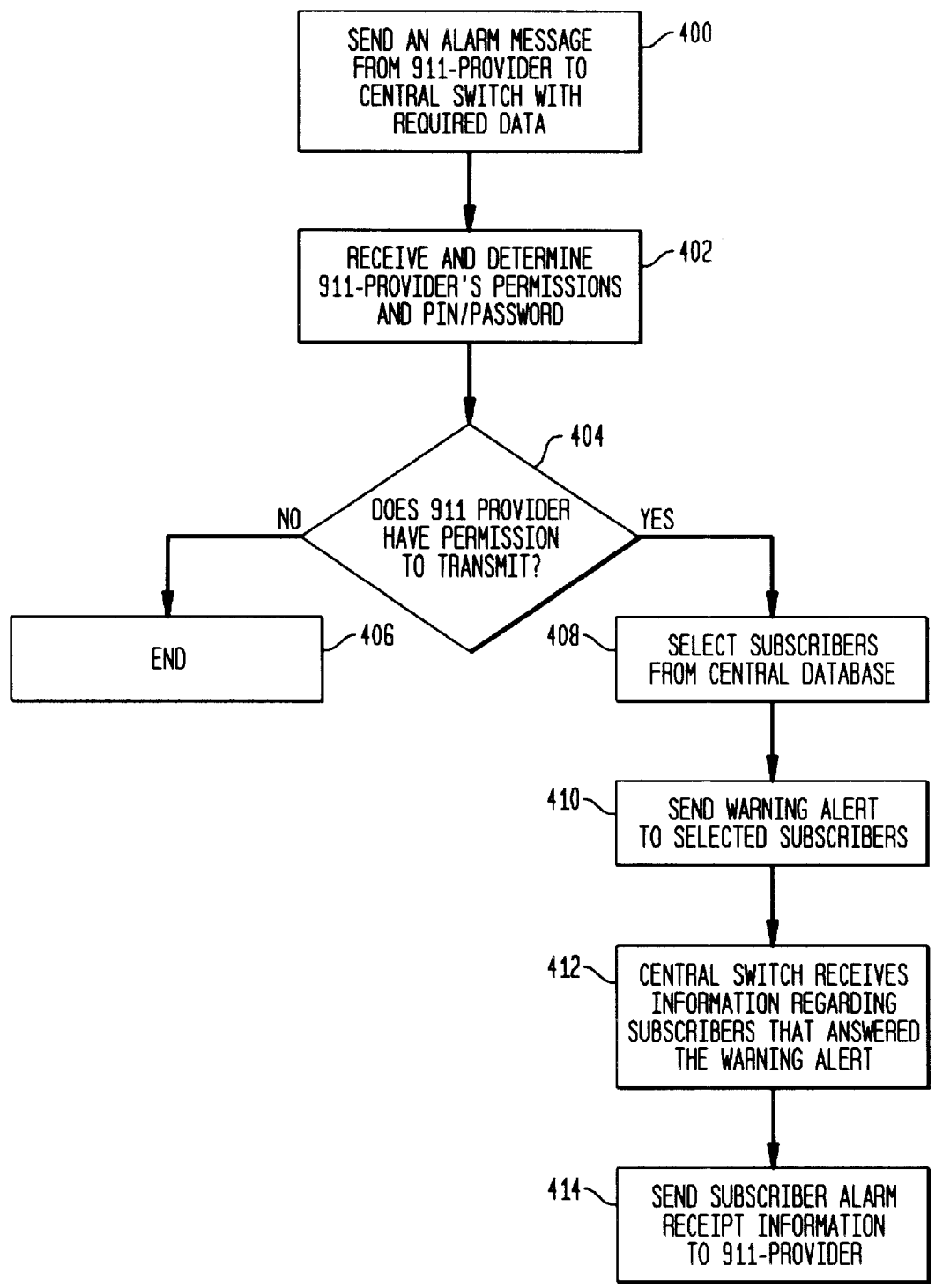
FIG. 4 is a flow chart illustrating a method according to one embodiment of the present invention.

FIG. 4 is a flow chart illustrating a method of operating the warning alert system according to one particular preferred embodiment. In the event of an imminent emergency situation, 911-provider 30 sends an alarm-message to central switch 10 through second link 60 as a first step 400. This alarm-message includes information about the geographic area and thus the subscribers to be informed about the imminent emergency situation. For example, the alarm-message can include information to notify all subscribers of communication system 1, or to notify subscribers connected to central switch 10, or to notify subscribers connected to the remote switch 20, or to send a warning alert to all subscribers in a specific geographic area A, B, C, or D or a subset thereof. The alarm-message may also include information to first notify a first area, then a second area, etc.

As a second step 402, central switch 10 determines whether the 911-provider 30 possesses the requisite permission to initiate the warning alert. In a preferred embodiment, this check is made by verifying the 911-provider's telephone number, which may be sent from the 911-provider 30 to the central switch 10 through second link 60 as part of the sending of the alarm message 400, against at least one, stored, authorized number in central database 12 of central switch 10. Additionally the 911-provider 30 may be further asked to send a provider-specific PIN (personal Identification number) or a provider-specific password to the central switch 10. If the 911-provider's telephone number, and the provider-specific PIN or password, does not verify when compared to the stored database of authorized numbers and PINs/passwords, step 404, no warning alert is distributed to the subscribers of the telecommunication system 1 and the process ends, step 406.

At decision step 404, if the 911-provider's telephone number and provider-specific PIN or password matches at least one of the stored authorized numbers in step 404 the controller 11 of the central switch 10 then selects the relevant subscribers from the central database 12 using the criteria and information sent in the alarm-message, step 408.

After selecting subscribers from the database, controller 11 sends a warning alert, step 410, directly to the selected subscriber's communication devices 16 via links 70 or to the selected subscriber's communication devices 26 and 46 via the remote switch 20 through first link 50 or via base station 40 through first link 51 respectively so as to distribute the warning alert to the appropriate subscribers.

After distribution the warning alert in step 412, the central switch 10 accepts data regarding those subscribers that answered the warning alert, in step 412. This data can be sent as a data message from the subscriber's communication devices to the central switch or may simply be a detection of the receipt of the warning alert by the communication devices, e.g. through the detection of an off-hook status in response to the alert. The central switch 10 then sends a message containing this information to the 911-provider 30 through second link 60 in step 412. With this information feedback, the 911-provider 30 may then selectively try to inform the non-answering subscribers in a different way.

The method of operating the warning alert system shown in FIG. 4 may also include steps to bill an appropriate entity for the provision of the emergency service. For example, a private warning distribution company may be contacted by local police, fire or emergency service departments to initiate the distribution of an emergency alert for a particular geographic area. The municipality itself, may therefore be the ultimate consumer and proper financial entity for which the telecommunications charges related to the distribution of the warning alert should be billed. Likewise, the local municipal entity may be acting on behalf of a federal agency that has issued a general warning, e.g. NOAA—Nation Oceanic and Atmospheric Administration or FEMA—Federal Emergency Management Administration. NOAA or FEMA, for example, may issue a hurricane warning or flood warning for a large geographic area. Each affected local municipality or 911 provider may then generate the emergency warning using available telecommunication system resources, realizing that some may not be functioning in the geographic area of interest. In any case, the federal agency may be the appropriate entity to be billed for the warning distribution.

With the financial attribution method, a billing database (not shown) may be provided for in the central switch that keeps track of each call placed by the controller. Further, if the subscribers' communication devices return data confirming actual receipt of the warning alert, as shown in steps 412 and 414 of FIG. 4, this data may also be stored in the billing database for appropriate billing of the emergency notification service.

Numerous embodiments may be used to distribute the warning alert in step 110 for the method shown in FIG. 4. These embodiments are further described below.

In one embodiment the warning alert is simply the sending of a specific ringing cadence to the selected subscribers' communications devices, whereby different types of warning alerts can be differentiated by different specific ringing cadences. If a selected subscriber line is busy, specific tones from the control database are sent out on the established call, whereby different types of warning alerts can be differentiated by different specific tones. In this embodiment, the controller 11 operates as a modulator, and the controller 11 selects an appropriate tone 318 from the central database 12 and modules this tone to present it to the call in progress so as to be heard by the calling parties.

To be most effective, the present invention would benefit from a public education campaign in which the subscribers are advised of the availability of the service and the meaning of the different ringing cadences and tones corresponding to the different types of warning alerts.

In a wirelined telecommunication system, the different ringing cadences and tones are provided to selected subscribers connected to remote switch 20 by the call signal generator (not shown) of the remote switch. The different ringing cadences or tones are sent to the selected communication devices 26 through the third links 70. In a wireless telecommunication system or a pager system, the different ringing cadences and tones are stored within the mobile communications devices 46 and are activated when the base station 40 sends specific messages to the mobile communications units 46.

In another embodiment of the present invention, a natural or synthesized/artificial announcement is sent to the selected subscribers. In this embodiment, the announcement contains more detailed information about the type of warning and/or the state of emergency. Alternatively, one general announcement may be provided that indicates an imminent emergency situation and advises the subscribers to consult their TV or radio for further information or to seek shelter or to evacuate. Power outage announcements may also be provided that inform the selected subscribers about an imminent or ongoing outage announcement may also provide information regarding the restoration of power. Typically, the warning announcement is sent to the called subscriber's communication device when an "off hook" condition for the device is detected by the remote switch or control switch.

If a selected subscriber is busy when a warning announcement attempt is made, any call in progress with the selected subscriber is bridged into a listen-only mode to facilitate delivery of the warning announcement. In another variation, any call in progress is actually interrupted to provide the warning announcement.

In another embodiment, the warning alert is sent with alphanumeric text from database 319 to a selected subscriber having a communication device equipped with an enhanced caller ID display. With this feature, controller 11 operates as text generator and selects an appropriate alphanumerical text message from the central database 12 and 319 and sends this message to the subscriber's communication device.

Analogous to the verbal announcements sent as above, the alphanumeric text contains information about the type of warning and/or the state of emergency. Alternatively, one general alphanumeric text message could be used to indicate an imminent emergency situation and advise the subscribers to consult their TV or radio for further information or to seek shelter or to evacuate. In addition, alphanumeric text may be provided informing the selected subscribers about a power outage and any subsequent restoration of power. The distribution of an alphanumeric text message may also be provided in addition to the distribution of a specific ringing cadence or tone or the distribution of a voice announcement 18. This feature can be realized not only in wirelined and wireless telecommunication systems, but also in pager systems.

The distribution of the numerous warning alerts may be accomplished by transmitting the warning alert to the selected subscribers sequentially or all at once. Depending on the number of switch functions that need to be accomplished when selected subscribers are notified, the messages may also be sent out group-wise, e.g. those closest to the problem location first, or with different messages going out first, e.g. the general announcement followed by specific information messages.

An additional power source for the central and remote switches may be necessary to concurrently transmit a ringing cadence to a large number of phones since a large amount of power is needed to send the ringing voltage to these numerous communications devices. Further, all non-emergency outgoing calls may be blocked in an effort to further reduce the number of functions performed by the switches during an emergency situation.

In another embodiment of the invention, the warning alert is distributed only to non-exempted subscribers e.g., communication emergency workers would not be interrupted in distributing the warning alert.

In still another embodiment of the invention, the selection of the subscribers is based on whether or not the subscribers are located in an area already covered with a different public warning system.

In still another embodiment of the invention, the warning alert is caused by a specific ringing of the subscriber's communication device, whereby the ringing causes a predetermined response in specific equipment for hearing impaired subscribers.

In still another embodiment of the invention, the emergency condition is a loss of telecommunication service and the subscribers are selected, not based on their geographic location but on their telecommunication service provider or service type and notified accordingly.

What has been described is merely illustrative of the application of the principles of the present invention. Other arrangements and methods can be implemented by those skilled in the art without departing from the spirit and scope of the present invention.

What is claimed is:

1. A telecommunication-based warning distribution system comprising:
   a central switch having a controller and a subscriber database, said subscriber database including information regarding a plurality of subscribers and subscriber characteristic data associated with each subscriber, said central switch coupled to a first plurality of communications devices associated with said plurality of subscribers;
   a remote switch coupled to said central switch, said remote switch coupled to a second plurality of communications devices associated with said second plurality of subscribers; and
   an emergency notification provider coupled to either of said central switch and said remote switch, said emergency notification provider generating a warning alert for subscribers having a particular subscriber characteristic and transmitting said warning alert to said central switch, said controller selecting a set of subscribers from said subscriber database that match said particular subscriber characteristic and routing said warning alert to said communication devices of said set of selected subscribers;
   wherein said subscriber characteristic is an actual, GPS-determined geographic location of said communication devices.

2. A telecommunication-based warning distribution system comprising:
   a central switch having a controller and a subscriber database, said subscriber database including information regarding a plurality of subscribers and subscriber characteristic data associated with each subscriber, said central switch coupled to a first plurality of communications devices associated with said plurality of subscribers;
   a remote switch coupled to said central switch, said remote switch coupled to a second plurality of communications devices associated with said second plurality of subscribers;
   an emergency notification provider coupled to either of said central switch and said remote switch, said emergency notification provider generating a warning alert for subscribers having a particular subscriber characteristic and transmitting said warning alert to said central switch, said controller selecting a set of subscribers from said subscriber database that match said particular subscriber characteristic and routing said warning alert to said communication devices of said set of selected subscribers; and
   a base station coupled to a third plurality of mobile communication devices associated with said plurality of subscribers, said controller selecting at least one subscriber from said third plurality of subscribers as matching said particular subscriber characteristic and routing said warning alert to said third plurality of mobile communication devices of said selected subscribers.

3. A method of distributing a warning using a telecommunication-based system comprising:
   selecting a warning alert from a plurality of warning alerts corresponding to a plurality of emergency conditions, said warning alert including warning type data and subscriber characteristic data;
   receiving at a switch said selected warning alert, said switch including:
      a controller,
      a subscriber database including information regarding a plurality of subscribers and subscriber characteristic data associated with each subscriber,
      and a tone database containing a plurality of ringing tones for use with a plurality of communication devices associated with said subscribers;
   selecting with said controller a set of subscribers from said subscriber database according to said subscriber characteristic data;
   selecting a ringing tone from said tone database corresponding to said warning alert type data; and
   routing said selected ringing tone warning alert to said selected subscribers;
   wherein said subscriber characteristic is an actual, GPS-determined geographic location of said communication devices.

4. The telecommunications-based warning system of claim 2 wherein said subscriber characteristic is a particular geographic area and said warning alert is routed to at least one of said third plurality of subscribers having a mobile communications device not generally associated with said particular geographical area.

5. A method of distributing a warning using a telecommunication-based system comprising:
   selecting a warning alert from a plurality of warning alerts corresponding to a plurality of emergency conditions, said warning alert including warning type data and subscriber characteristic data;
   receiving at a switch said selected warning alert, said switch including:
      a controller,
      a subscriber database including information regarding a plurality of subscribers and subscriber characteristic data associated with each subscriber,
      and a tone database containing a plurality of ringing tones for use with a plurality of communication devices associated with said subscribers;
   selecting with said controller a set of subscribers from said subscriber database according to said subscriber characteristic data, said controller selecting at least one subscriber from a third plurality of mobile communication devices coupled to a base station and associated with said plurality of subscribers said third plurality of subscribers as matching said particular subscriber characteristic and routing said warning alert to said third plurality of mobile communication devices of said selected subscribers;
   selecting a ringing tone from said tone database corresponding to said warning alert type data; and
   routing said selected ringing tone warning alert to said selected subscribers.

6. The method of providing a warning alert of claim 5 wherein said subscriber characteristic is a particular geographic area and said warning alert is routed to at least one of said third plurality of subscribers having a mobile communications device not generally associated with said particular geographical area.

* * * * *